(12) United States Patent
Hu et al.

(10) Patent No.: US 9,008,016 B2
(45) Date of Patent: Apr. 14, 2015

(54) DATA TRANSMISSION METHOD AND SYSTEM

(75) Inventors: Lijie Hu, Beijing (CN); Kan Zheng, Beijing (CN); Lin Huang, Beijing (CN)

(73) Assignee: France Telecom, Paris (FR)

( * ) Notice: Subject to any disclaimer, the term of this patent is extended or adjusted under 35 U.S.C. 154(b) by 216 days.

(21) Appl. No.: 13/512,808

(22) PCT Filed: Nov. 30, 2010

(86) PCT No.: PCT/IB2010/003435
§ 371 (c)(1),
(2), (4) Date: May 30, 2012

(87) PCT Pub. No.: WO2011/064676
PCT Pub. Date: Jun. 3, 2011

(65) Prior Publication Data
US 2012/0236815 A1 Sep. 20, 2012

(30) Foreign Application Priority Data
Nov. 30, 2009 (WO) ................ PCT/CN2009/075218

(51) Int. Cl.
*H04W 72/04* (2009.01)
*H04L 1/18* (2006.01)
*H04L 5/00* (2006.01)

(52) U.S. Cl.
CPC ........... *H04L 1/1822* (2013.01); *H04W 72/042* (2013.01); *H04L 1/1812* (2013.01); *H04L 1/1893* (2013.01); *H04L 5/0044* (2013.01)

(58) Field of Classification Search
CPC ... H04L 5/0044; H04L 1/1893; H04L 1/1812; H04L 1/1822; H04W 72/04; H04W 72/0486; H04W 72/08; H04W 72/20; H04W 46/16

USPC ............... 370/216–336; 455/68, 434, 450
See application file for complete search history.

(56) References Cited

U.S. PATENT DOCUMENTS

| | | | |
|---|---|---|---|
| 2007/0142046 A1* | 6/2007 | Welnick | 455/434 |
| 2008/0292010 A1* | 11/2008 | Wernears | 375/260 |
| 2009/0232074 A1* | 9/2009 | Yang et al. | 370/329 |
| 2010/0232373 A1* | 9/2010 | Nory et al. | 370/329 |
| 2010/0296389 A1* | 11/2010 | Khandekar et al. | 370/216 |

(Continued)

OTHER PUBLICATIONS

International Search Report and Written Opinion dated May 4, 2011 for corresponding International Application No. PCT/IB2010/003435, filed Nov. 30, 2010.

(Continued)

*Primary Examiner* — Afsar M Qureshi
(74) *Attorney, Agent, or Firm* — David D. Brush; Westman, Champlin & Koehler, P.A.

(57) ABSTRACT

A method and apparatus are provided for allocating carriers from a list of carriers in a telecommunication network. Each of the carriers allow transmission of a transmission control frame, each of said transmission control frame has a data block corresponding to a data stream and an indication of the previous carrier allocated to the data stream. The method includes, for a transmission control frame and a carrier selected for allocation to the transmission control frame in the list of carriers, the steps of determining the number of binary bits needed to identify the number of carriers in the list of carriers, coding the indication based on the determined number of binary bits, and removing the allocated carrier from the list of carriers.

22 Claims, 6 Drawing Sheets

(56) References Cited

U.S. PATENT DOCUMENTS

| | | | |
|---|---|---|---|
| 2011/0026475 A1* | 2/2011 | Lee et al. | 370/329 |
| 2011/0070845 A1* | 3/2011 | Chen et al. | 455/91 |
| 2011/0076962 A1* | 3/2011 | Chen et al. | 455/68 |
| 2011/0310856 A1* | 12/2011 | Hariharan et al. | 370/336 |
| 2011/0312326 A1* | 12/2011 | Kwon et al. | 455/436 |
| 2012/0057499 A1* | 3/2012 | Pedersen et al. | 370/252 |
| 2012/0182957 A1* | 7/2012 | Noh et al. | 370/329 |
| 2012/0218882 A1* | 8/2012 | Ko et al. | 370/216 |
| 2013/0295862 A1* | 11/2013 | King et al. | 455/99 |
| 2013/0329678 A1* | 12/2013 | Pan et al. | 370/329 |

OTHER PUBLICATIONS

LG Electronics, "HARQ Mapping Across Aggregated Component Carriers", 3GPP Draft; R1-090652 HARQ Process for Aggregated CCS, 3rd Generation Partnership Project (3GPP), Mobile Competence Centre; 650, Route Des Lucioles; F-06921 Sophia-Antipolos Cedex; France, No. Athens, Greece; 20090203. Feb. 3, 2009, XP050318529.

* cited by examiner

DATA TRANSMISSION METHOD AND SYSTEM

CROSS-REFERENCE TO RELATED APPLICATIONS

This Application is a Section 371 National Stage Application of International Application No. PCT/IB2010/003435, filed Nov. 30, 2010, which is incorporated by reference in its entirety and published as WO 2011/064676 on Jun. 3, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates in general to telecommunication network functions and more specifically to telecommunication carrier identification.

BACKGROUND OF THE DISCLOSURE

On one hand, 3GPP LTE (Long Term Evolution) is the name given to a project within the Third Generation Partnership Project (3GPP) to improve the UMTS mobile phone standard to cope with future requirements. Goals have included so far improving efficiency, lowering costs, improving services, making use of new spectrum opportunities, and better integration with open standards. In another hand, International Mobile Telecommunication (IMT)-Advanced has aimed at providing enhanced peak data rates to support advanced services and applications (100 Mbit/s for high and 1 Gbit/s for low mobility were established as targets for research). Altogether, future 3GPP LTE-Advanced systems will require wider system bandwidth, e.g. up to 100 MHz, to achieve such high target peak data rates. However, it may become a challenge to find contiguous spectrum allocations that can accommodate such wide bandwidth, since the spectrum bands are limited. Furthermore, spectrum segments used by operators but not necessarily located contiguously or in the same frequency band may be considered. At the same time, backward compatibility towards LTE Release-8 (prior to LTE-Advanced) should be ensured. Carrier aggregation (CA) is a natural choice that could either meet the bandwidth extension requirement or ensure sufficient backward compatibility towards LTE Release-8. In Carrier Aggregation, multiple Component Carriers (CCs) are aggregated according to the desired LTE-Advanced system bandwidth. These CCs are either LTE Release-8 compatible or designed specially to support new LTE Advanced features. A LTE Release-8 user equipment may receive one of these component carriers, while an LTE-Advanced user equipment may simultaneously access multiple component carriers. Compared to other approaches, carrier aggregation does not require extensive changes of LTE physical layer structure, and can reuse the most of the existing implementations.

When Carrier Aggregation is implemented, existing Hybrid Automatic Repeat Request method is an important aspect. The Hybrid Automatic Repeat Request (Hybrid ARQ, H-ARQ) is a variation of an Automatic Repeat Request (ARQ) error control method, which performs better ARQ, particularly over wireless channels. An example of HARQ, also referred to as Type I HARQ, combines Forward Error Correction (FER) and ARQ by encoding a data block and error-detection information (such as Cyclic Redundancy Check (CRC)) with an error-correction code (such as e.g. Reed-Solomon code or Turbo code) prior to transmission. When the coded data block is received, the receiver first decodes the error-correction code. If the channel quality is good enough, all transmission errors should be correctable, and the receiver may derive the correct data block. If the channel quality is not good enough and not all transmission errors can be corrected, the receiver detects this situation using the error-detection code, then the received coded data block may be discarded or stored and a retransmission is requested by the receiver, similar to ARQ. In practice, incorrectly received coded data blocks (i.e. erroneous data blocks) are often stored at the receiver rather than discarded, and when the retransmitted block is received, the two blocks are combined (chase combining) before being fed to the decoder of the error-correction code. This can increase the probability of successful decoding. An another existing solution is Type II/III HARQ, or incremental redundancy HARQ, where different (re)transmissions are coded differently rather than repeating the same coded bits as in chase combining. Performance is improved, since coding is effectively done across retransmissions. The difference between type III HARQ and type II HARQ is that the retransmission packets in Type III HARQ can be decoded by themselves. The HARQ method uses at least one HARQ process and some HARQ process entities, here under referred to, respectively, as set of transmission control frames and transmission control frames. Each transmission control frame may comprise one or more header and one or more data blocks. Each transmission control frames are transmitted between an emitter and a receiver in a telecommunication network. In other words, data blocks are transmitted using transmission control frames. Moreover, the plurality of carriers may be divided into time intervals or time slots, wherein each transmission control frame is transmitted on each carrier at each time interval (as described here under in reference to FIG. 3).

In wireless Carrier Aggregation (CA) systems, for example, one User Equipment (UE) may be scheduled simultaneously on multiple (i.e. a plurality of) Component Carriers (CCs). Therefore, re-transmission of data blocks may be allowed across CCs in order to better exploit frequency diversity. In other words, errors detected in a data block transmitted in a first carrier are less likely to happen in retransmission of the same data block on another carrier at a different frequency. HARQ process entities may be grouped into sets, each set being dedicated, for example, to a given user equipment or data stream. Multiple stop-and-wait HARQ process entities may be transmitted in parallel on the same or different CC(s) so that while one HARQ process is waiting for an acknowledgement for a given HARQ process entity other HARQ process entities may use the carrier(s) to send additional packets. For each user equipment, there may be one HARQ process or transmission control frame process, each comprising a plurality of HARQ process entities or transmission control frames. The number of HARQ process entities should be in accordance with the roundtrip time between the emitter and the receiver to allow for continuous transmission, including the respective processing time of the data blocks, HARQ process entities and HARQ process. For example, the emitter and the receiver may be a user equipment (UE) and a eNodeB (station or radio controller element of the 3GPP LTE network) or vice-and-versa. Using a larger number of HARQ process entities than required by the roundtrip time does not provide any gain, but rather introduces unnecessary delays between retransmissions. Since processing time of the of the data blocks, HARQ process entities and HARQ process for an eNodeB may differ among different implementations, the number of HARQ process entities may be configurable. For example, a set of eight HARQ process entities or transmission control frames may be used for a given component carrier or user equipment or data stream. When Carrier Aggregation is used, one HARQ process (i.e. a set of HARQ process entities) may be used per component carrier (called here under "carrier" for simplification purposes) to increase the number of HARQ process entities (and therefore the bandwidth) for one user equipment.

To perform operations such as soft combining (cohesion of data streams from multiple base stations or eNodeB that share a common time line and are operated according to it), in-sequence delivery and so on, the UE has to identify the HARQ process entities or transmission control frames of the carrier(s) it transmits on.

HARQ process sets may be flexibly mapped to carriers up-link and down-link. It allows retransmission across carriers, which may derive higher frequency diversity gain or flexible scheduling gain. However, additional bits are needed in the header (here under called transmission control frame indication) of each transmission control frame are needed to identify the previous carrier the transmission control frame was transmitted onto. This seems to be a large signalling overhead, especially when using many carriers. This indication may be used for instance by an emitter to inform a receiver of which HARQ process set has been used in a control channel (such as e.g. a Physical Downlink Shared Channel (PDSCH) or a Physical Uplink Shared Channel (PUSCH)). It may also be considered that flexible HARQ process sets mapping to carriers is allowed to a limited range only (e.g. only for retransmissions within carrier pairs, etc. . . . ) for signalling efficiency.

As described in document "3GPP TSG RAN WG1 #56, R1-090652, "HARQ mapping across aggregated component carriers", LG Electronics, 9-13 Feb., 2009" which is considered as the most relevant state of the art document: the simplest way is to list all of the possibilities and inform the destination, requiring thus $n.[\log_2 n]$ bits of signalling. The major drawback with this method is that there is a need for much control signalling and, in particular, control signalling overheads are too big.

Today there is no solution to efficiently reduce signalling overhead that allow reducing signalling and thus improving efficiency of such wireless telecommunication systems.

Today there is a need for a control signalling solution that can be easily implemented on the existing communication infrastructures.

SUMMARY

An embodiment of the present disclosure is directed to a method of coding the identification of carriers from a list of carriers in a telecommunication network, each of said carriers allowing transmission of a transmission control frame, each of said transmission control frame comprising:
　a data block corresponding to a data stream, and
　an indication of a previous carrier allocated to the data stream,
said method comprising, for a transmission control frame and a carrier selected for allocation to said transmission control frame in said list of carriers:

determining with an emitter device the number of binary bits needed to identify the number of carriers in the list of carriers,
coding with an emitter device the indication based on the determined number of binary bits,
removing the allocated carrier from the list of carriers, and renumbering the remaining carriers in the list of carriers.

Another embodiment of the present disclosure is directed to a method of identifying carriers from a list of carriers in a telecommunication network, each of said carriers allowing transmission of a transmission control frame, each of said transmission control frame comprising:
　a data block corresponding to a data stream, and
　an indication of a previous carrier allocated to the data stream,
said method comprising, for a transmission control frame received on a given carrier in said list of carriers, the following steps, at least one of which being performed by a receiver device:
　identifying a carrier in the list of carriers using the indication,
　removing the identified carrier from the list of carriers, and renumbering the remaining carriers in the list of carriers.

Another embodiment of the present disclosure is directed to an emitter for coding the identification of carriers from a list of carriers in a telecommunication network, each of said carriers allowing transmission of a transmission control frame, each of said transmission control frame comprising:
　a data block corresponding to a data stream, and
　an indication of a previous carrier allocated to the data stream,
said emitter comprising, for a transmission control frame and a carrier selected for allocation to said transmission control frame in said list of carriers:
　a computer processing system configured to perform steps of:
　determining the number of binary bits needed to identify the number of carriers in the list of carriers,
　coding the indication based on the determined number of binary bits,
　removing the allocated carrier from the list of carriers, and renumbering the remaining carriers in the list of carriers.

Another embodiment of the present disclosure is directed to a receiver for identifying carriers from a list of carriers in a telecommunication network, each of said carriers allowing transmission of a transmission control frame, each of said transmission control frame comprising:
　a data block corresponding to a data stream, and
　an indication of a previous carrier allocated to the data stream,
said receiver comprising, for a transmission control frame received on a given carrier in said list of carriers:
　a computer processing system configured to perform steps of:
　identifying a carrier in the list of carriers using the indication,
　removing the identified carrier from the list of carriers, and renumbering the remaining carriers in the list of carriers.

Another embodiment of the present disclosure is directed to a system, said system comprising:
　a telecommunication network,
　an emitter in said telecommunication network for coding an identification of carriers from a list of carriers in the telecommunication network, each of said carriers allowing transmission of a transmission control frame, each of said transmission control frame comprising:
　a data block corresponding to a data stream, and an indication of a previous carrier allocated to the data stream, said emitter comprising, for a transmission control frame and a carrier selected for allocation to said transmission control frame in said list of carriers:

a first computer processing system configured to perform steps of:

determining the number of binary bits needed to identify the number of carriers in the list of carriers, coding the indication based on the determined number of binary bits, removing the allocated carrier from the list of carriers, and renumbering the remaining carriers in the list of carriers, and a receiver in said telecommunication network receiver for identifying the carriers from the list of carriers, said receiver comprising, for a transmission control frame received on a given carrier in said list of carriers:

a second computer processing system configured to perform steps of:

identifying a carrier in the list of carriers using the indication, removing the identified carrier from the list of carriers, and renumbering the remaining carriers in the list of carriers.

Another embodiment of the present disclosure is directed to a non-transitory computer-readable medium having computer-executable instructions to enable a computer system to perform a method of coding the identification of carriers from a list of carriers in a telecommunication network, each of said carriers allowing transmission of a transmission control frame, each of said transmission control frame comprising:

a data block corresponding to a data stream, and an indication of a previous carrier allocated to the data stream, said method comprising, for a transmission control frame and a carrier selected for allocation to said transmission control frame in said list of carriers:

determining with an emitter device the number of binary bits needed to identify the number of carriers in the list of carriers, coding with an emitter device the indication based on the determined number of binary bits, removing the allocated carrier from the list of carriers, and renumbering the remaining carriers in the list of carriers.

Another embodiment of the present disclosure is directed to a non-transitory computer-readable medium having computer-executable instructions to enable a computer system to perform a method of identifying carriers from a list of carriers in a telecommunication network, each of said carriers allowing transmission of a transmission control frame, each of said transmission control frame comprising:

a data block corresponding to a data stream, and an indication of a previous carrier allocated to the data stream, said method comprising, for a transmission control frame received on a given carrier in said list of carriers, the following steps, at least one of which being performed by a user equipment device:

identifying a carrier in the list of carriers using the indication, removing the identified carrier from the list of carriers, and renumbering the remaining carriers in the list of carriers.

When the re-transmitted data blocks are flexibly scheduled in transmission control frames across a plurality of carriers, the receiver needs to know which carrier the re-transmitted data blocks originally locate on, and then performs combining with the corresponding corrupted block in buffer. The method according to an embodiment of the invention allows identifying the permutation of the transport blocks efficiently.

First, the CCs are ordered in an ascending/descending way and numbered for identification. Then, several signalling bits are associated to each transmission control frame to transmit, indicating the previous carrier the transmission control frame was transmitted onto. Finally, the receiver determines the corresponding relationship according to the received signalling bits.

An embodiment of the invention allows reducing the transmission control frame identification bits when transmission control frames are flexibly mapped onto up-link or down-link carriers. By identifying the previous carrier on which erroneous data blocks were transmitted among the plurality of carriers, the number of bits in the transmission control frame indication may be reduced to $[\log_2 n]+[\log_2 (n-1)]+\ldots+[\log_2 2]$ bits at each time interval.

Furthermore, in an additional embodiment of the present invention, the signalling bits may be transmitted together in a single transmission control frame indication or separately in each transmission control frame indication.

BRIEF DESCRIPTION OF THE DRAWINGS

Embodiments of the present disclosure will now be described solely by way of example and only with reference to the accompanying drawings, where like parts are provided with corresponding reference numerals, and in which.

DETAILED DESCRIPTION OF ILLUSTRATIVE EMBODIMENTS

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, devices etc. . . . , for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, gateways or other entities in a telecommunication network are not detailed as their implementation is beyond the scope of the present system and method.

The method and system according to an embodiment of the invention involve an emitter and a receiver. Unless specified otherwise, the exemplary embodiment will be described hereafter in its application to a eNodeB and a user equipment of a wireless telecommunication network. Both may be either receiver or emitter.

In addition, it should be expressly understood that the drawings are included for illustrative purposes and do not represent the scope of the present system.

Figure 1:
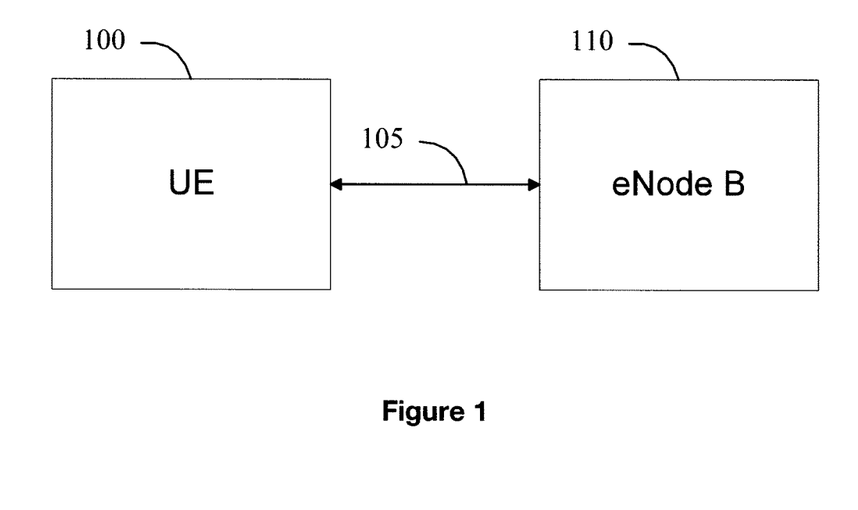
FIG. 1 schematically illustrates a system according to an embodiment of the present invention.

FIG. 1 describes an illustrative embodiment of a system according to an embodiment of the invention. A User Equipment (UE) 100 may exchange data blocks of information with an eNodeB 110 on a communication interface of a telecommunication network 105. Data blocks may correspond to different streams of data to exchange between the UE 100 and the eNodeB 110. Data blocks are transmitted in transmission control frames. A transmission control frame may be for example a HARQ process entity. Transmission control frames allow data blocks to be transmitted on one or more carrier(s) of the communication interface of a telecommunication network 105. Data blocks are embedded in transmission control frames. Therefore, carrier allocation needs to be performed to allocate or select a carrier to transmit each transmission control frame.

Carriers are divided into time intervals or time slots. Carriers are sequenced, named or numbered so that they may be used in the same order on each time slot. Each carrier allows exchanging (in other words, sending and/or receiving) data blocks using transmission control frames. Each transmission control frame comprises at least one data block corresponding to a data stream of data blocks. Transmission control frames are exchanged between an emitter and a receiver.

Each data stream may be associated with a set of transmission control frames. Data blocks may be associated with the same data stream by being, for example, comprised in transmission control frames of the same set of transmission control frames.

The number of transmission control frames may correspond to the number of data blocks that may be sent while waiting for receiving a feed-back or acknowledgement message for the first transmission control block associated with the first sent data block. The feed-back message may be sent by the receiver to inform the emitter that a given data block in a given transmission control frame was received either successfully or unsuccessfully. Each time a receiver receives a transmission control frame, it analyses the data block(s) comprised in the transmission data block to detect any error that may have occurred during the transmission of the transmission control frame. Error detection may be performed for example using existing error-detection or error-correction codes. When no error is detected, the analyzed received data block may be used to reconstruct the data stream associated with it at the receiver. When an error is detected, a feedback message is sent by the receiver of the transmission control frame associated with the erroneous data block to the emitter of the transmission control frame for the corresponding data block. Once, it has received an unsuccessful feedback message for a given erroneous data block from the receiver, the emitter needs the reschedule the transmission of the erroneous data block to the receiver. The same transmission control frame (in other words, the same process entity) is used to retransmit the data block. This allows the receiver to identify the retransmitted data block that corresponds to the erroneous data block. Erroneous data blocks are retransmitted using the same transmission control frame so that two successive transmission control frames comprise either two successive new or correct (i.e. successful) data blocks or one erroneous data block in the former transmission control frame and the retransmitted data block in the latter transmission control frame.

The error in the received data block may be due to quality of the carrier used for transmitting the corresponding control frame. The emitter needs therefore the reschedule the transmission of the erroneous data block to the receiver onto a different carrier, using the same transmission control frame. The allocation of carriers is performed carrier by carrier. Firstly, each data block to retransmit from the emitter is assigned to the same transmission control frame than the one previously used (i.e. the last transmission control frame used for previously send the data block). A carrier, preferably a different carrier from the one previously used, is allocated for transmitting said transmission control frame. Then, remaining or non-allocated carriers may be allocated to transmission control frame for transmitting data blocks that have never been transmitted yet.

The carrier associated with a transmission control frame at a given time may be identified by an identifier. Said identifier may be for instance coded on a binary number. Carriers are therefore numbered. For example, 2 binary bits are needed to identify four carriers a, b, c, d as respectively 00, 01, 10 and 11, 3 bits are needed for identify 5 to 8 carriers, etc. . . . .

Figure 2:
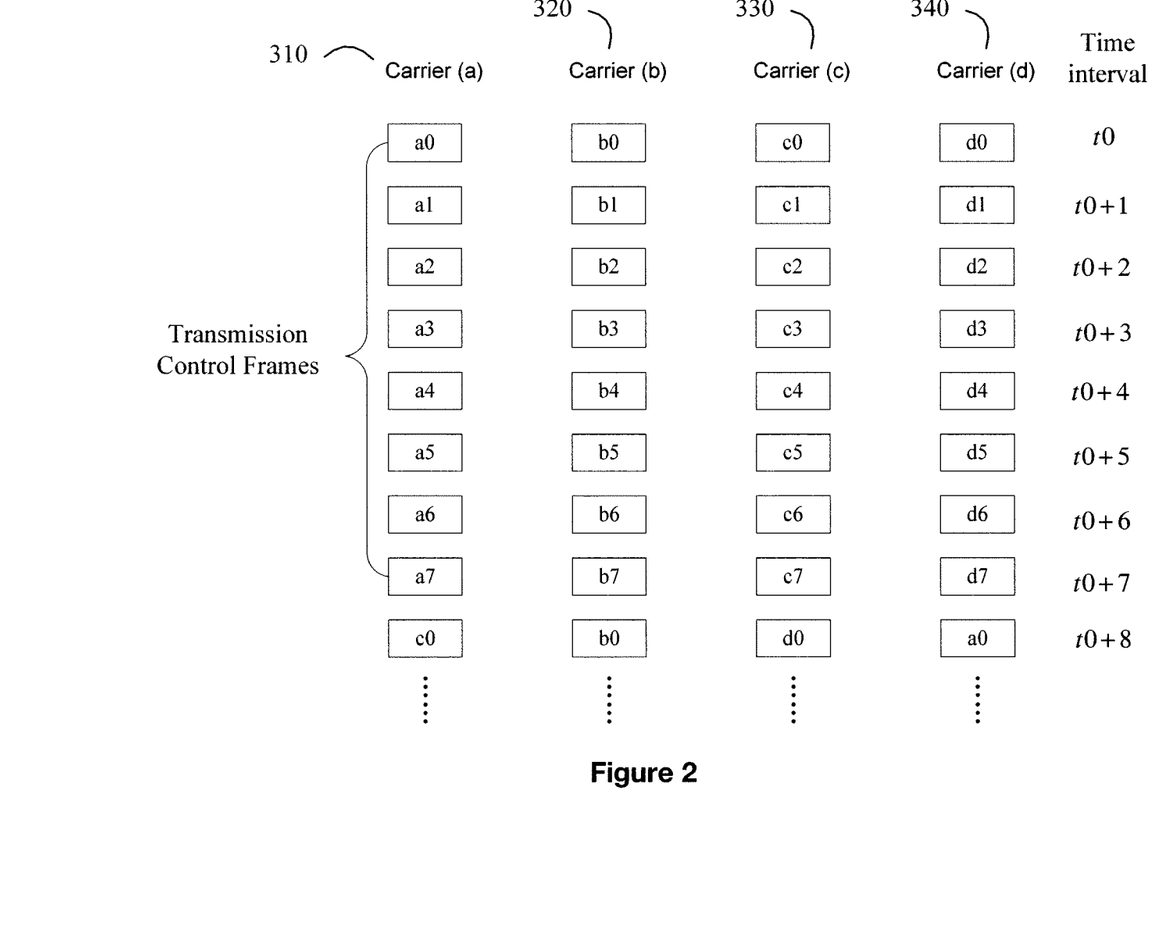
FIG. 2 schematically illustrates a method according to an embodiment of the present invention.

FIG. 2 describes an illustrative embodiment of the invention using four carriers (a) 310, ID (b) 320, (c) 330 and (d) 340 as an example. The number of carriers does not limit the scope of the present invention. Each set of transmission control frames comprises eight transmission control frames.

For instance, a first set of transmission control frames may be labelled as $\{a_0, a_1, \ldots, a_7\}$, wherein $a_i$ is the $(i+1)^{th}$ transmission control frame of the first set of transmission control frames. As described in FIG. 3, for instance, the set of transmission control frames $\{a_0, a_1, \ldots, a_7\}$ on respectively time intervals $\{t_0, t_1, \ldots, t_7\}$. As explained here above, the number of time intervals needed to send, from the emitter, all the transmission control frames in a set to the receiver may correspond to the time needed to receive at the emitter the feedback message from the receiver. For example, on FIG. 3, the data blocks comprised respectively in transmission control frames $a_0$ and $d_0$ are erroneous. In this case, when the emitter receives the corresponding feedback messages by the end of time interval $t_0+7$ (in other words, before eight times the time interval duration from the sending of the first transmission control frame of the set), it needs to reschedule the retransmission of the same original data blocks in the same transmission control frames (respectively in $a_0$ and $d_0$) but on other carriers using the method according to an embodiment of the invention.

In FIG. 3, the transmission control frame $a_0$ transmitted on carrier (a) 310 at time interval $t_0$ and comprising the data block(s) to retransmit (i.e. the data block(s) received with error at the receiver) is rescheduled on carrier (d) 340 at time interval $t_{0+8}$. The transmission control frame $d_0$ transmitted on carrier (d) 340 at time interval $t_0$ and comprising the data block(s) to retransmit (i.e. the data block(s) received with error at the receiver) is rescheduled on carrier (c) 330 at time interval $t_{0+8}$.

Figure 3A:
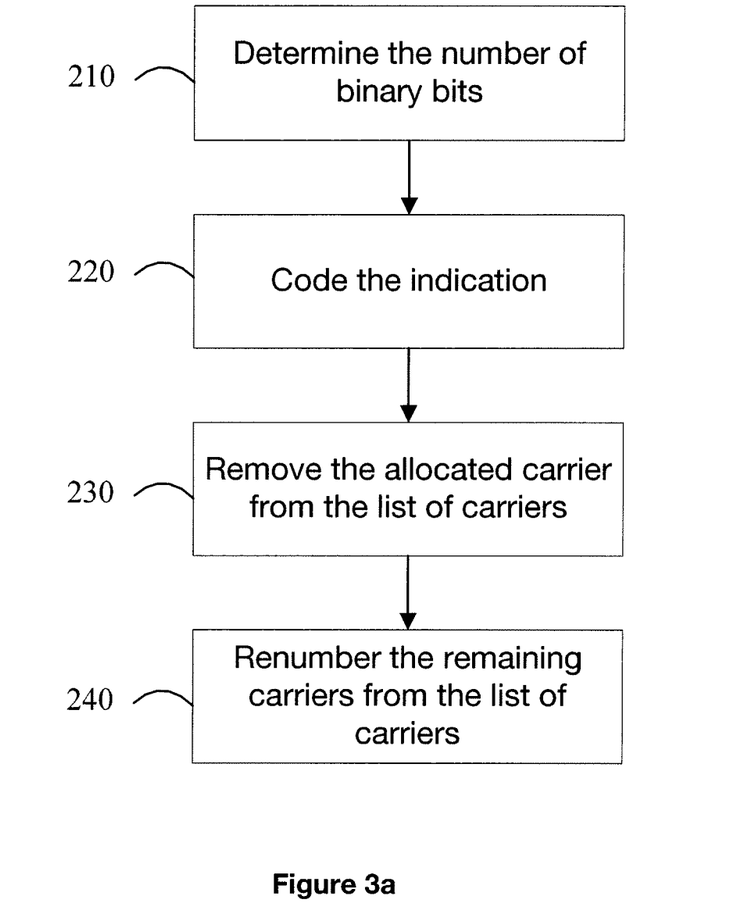
FIG. 3 schematically illustrates transmission control frames distribution across carriers according to an embodiment of the present invention.

FIG. 3a describes an illustrative embodiment of the method according to the invention performed by the emitter. The method allows coding the identification of carriers from a list of carriers in a telecommunication network 105 prior to transmission of the corresponding transmission control frame. Each of the carriers allows the transmission of a transmission control frame. Each of the transmission control frame comprises:

a data block corresponding to a data stream, and
an indication of the previous carrier allocated to the data stream.

For a transmission control frame and a carrier selected for allocation to said transmission control frame in the list of carriers, an act 210 allows determining the number of binary bits needed to identify the number of carriers in the list of carriers. In an act 220, the indication identifying the carrier on which the same transmission control frame, and therefore corresponding to the same data stream, was previously transmitted is coded based on the determined number of binary bits is coded. Eventually, once allocated, the allocated carrier is removed from the list of carriers in act 230, the remaining carriers in the list of carriers are renumbered in act 240 and the method may be performed until all the carriers have been allocated.

Figure 3B:
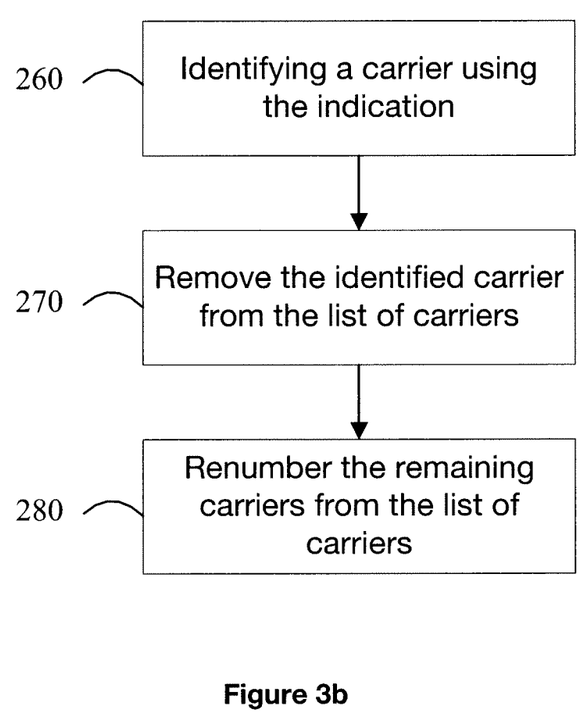

FIG. 3b describes an illustrative embodiment of the method according to the invention performed by the receiver.

The method allows identifying carriers from a list of carriers in a telecommunication network 105. Each of the carriers allows the transmission of a transmission control frame. Each of said transmission control frame comprises:
a data block corresponding to a data stream, and
an indication of the previous carrier allocated to the data stream.

For a transmission control frame received on a given carrier in said list of carriers: an act 260 allows identifying a carrier in the list of carriers using the indication, then the identified carrier is removed from the list of carriers in act 270, and the remaining carriers in the list of carriers are renumbered in act 280.

Figure 4:
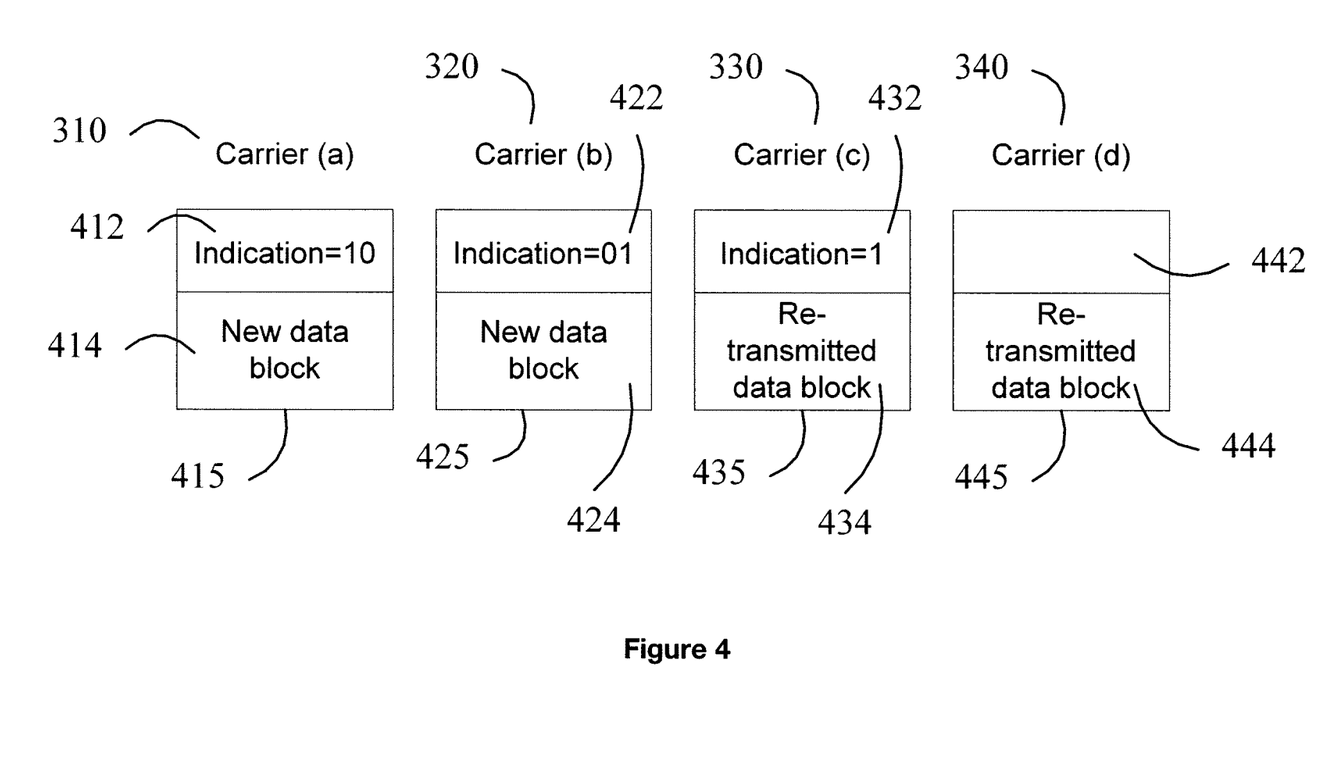
FIG. 4 schematically illustrates transmission control frames at a time interval according to an embodiment of the present invention.

FIG. 4 describes the indications in transmission control frames at time interval $t_{0+8}$, in reference to FIG. 3, in the method according to an embodiment of the invention. The emitter allocates a carrier and determines the bits for identifying said carrier then inserts them as indication(s) into the transmission control frame(s). The receiver retrieves the bits for identifying the carriers of the indication from the transmission control frame(s).

Data blocks transmitted in transmission control frames $b_0$ and $c_0$ at time interval $t_0$ were successful (i.e. not erroneous). Data blocks transmitted in transmission control frames $a_0$ and $d_0$ at time interval $t_0$ were unsuccessful (i.e. erroneous).

At time interval $t_{0+8}$, new data blocks (i.e. that have never been transmitted yet in the current data stream transmissions) are transmitted in transmission control frames $b_0$ and $c_0$. Transmission control frame $c_0$ is transmitted over carrier (a) (in other words, carrier (a) is allocated to transmission control frame $b_0$) and comprises an indication that it was transmitted at time interval $t_0$ on carrier (c).

As all four carriers are at first to be allocated, the number of binary bits needed, as explained here above, to identify a carrier among the four carriers is determined as being 2 (carrier (a) may be identified as '00', carrier (b) may be identified as '01', carrier (c) may be identified as '10' and carrier (d) may be identified as '11'). The indication indicating that carrier (c) was used to transmit transmission control frame $c_0$ at time interval $t_0$ is thus coded on 2 bits as described in FIG. 4 (corresponding to bits '10'). Carrier (c) on which the transmission control frame $c_0$ was previously transmitted at time interval $t_0$ is removed from the list of carriers. There are therefore 3 carriers left at this stage on the list of carriers (i.e. carriers that were use to transmit other transmission control frames at time interval $t_0$), namely carriers (a), (b) and (d).

Carrier (b) is then allocated with a new data block(s) as the previous data block(s) transmitted using transmission control frame $b_0$ was not erroneous. The number of binary bits needed to identify the three remaining carriers is 2 (carrier (a) may be identified as '00', carrier (b) may be identified as '01' and carrier (d) may be identified as '10'). The indication corresponding thus to carrier (b) to insert the transmission control frame $b_0$ is 01. Carrier (b) used at time interval $t_0$ is then removed from the list of carriers and there now are two carriers remaining in the list namely carriers (a) and (d). There is a need for only 1 bit to identify the two remaining carriers whose transmission control frame transmitted at time interval $t_0$ have not been allocated yet at time interval $t_{0+8}$: '0' for carrier (a) and '1' for carrier (d). The indication '1' corresponding to carrier (d) is thus inserted into the transmission control frame $d_0$ on selected carrier (c). For indication the remaining carrier (a), '0' may be inserted as an indication into the transmission control frame $a_0$ or preferably not be inserted as shown in FIG. 4 as there is only one carrier to identify among the list of carriers (i.e. there is no other choice) and it is therefore useless to use a binary bit to indicate it.

Subsequent to transmission at time interval $t_{0+8}$, the receiver analyzes on each carrier, in each transmission control frame, each indication. As there are four carriers, the receiver may determine that 2 binary bits are needed to identify one carrier among the four. The indication '10' in the first transmission control frame on carrier (a) indicates thus that the third carrier among the four (identified sequentially as '00', '01', '10' and '11') was previously used for the transmission of the same transmission control frame at time interval $t_0$. The receiver may thus remove carrier (c) from the list of carrier. The three remaining carriers (a, b and d) are renumbered as being identified respectively as '00', '01' and '10'. The receiver then analyzes the indication in the transmission control frame of carrier (b): '01', which indicates the second carrier in the list of remaining carriers (a, b, d), namely carrier (b), used by the same transmission control frame at time interval $t_0$. It removes then carrier (b) from the list of carriers. Carriers (a and d) remains thus in the list of carriers, which corresponds to renumbered carriers '0' and '1'. Then, the receiver analyzes the indication '1' in the transmission control frame of carrier (c). There are only two carriers remaining, so only one binary bit is needed to identify one of them. '1' corresponds in the list of carrier (a, d) to carrier (d), which is removed from the list of carriers. The receiver then concludes that the remaining carrier in the list, carrier (a) in this example, is the carrier on which the transmission control frame received on carrier (d) at time interval $t_{0+8}$ was transmitted at time interval $t_0$.

Figure 5:
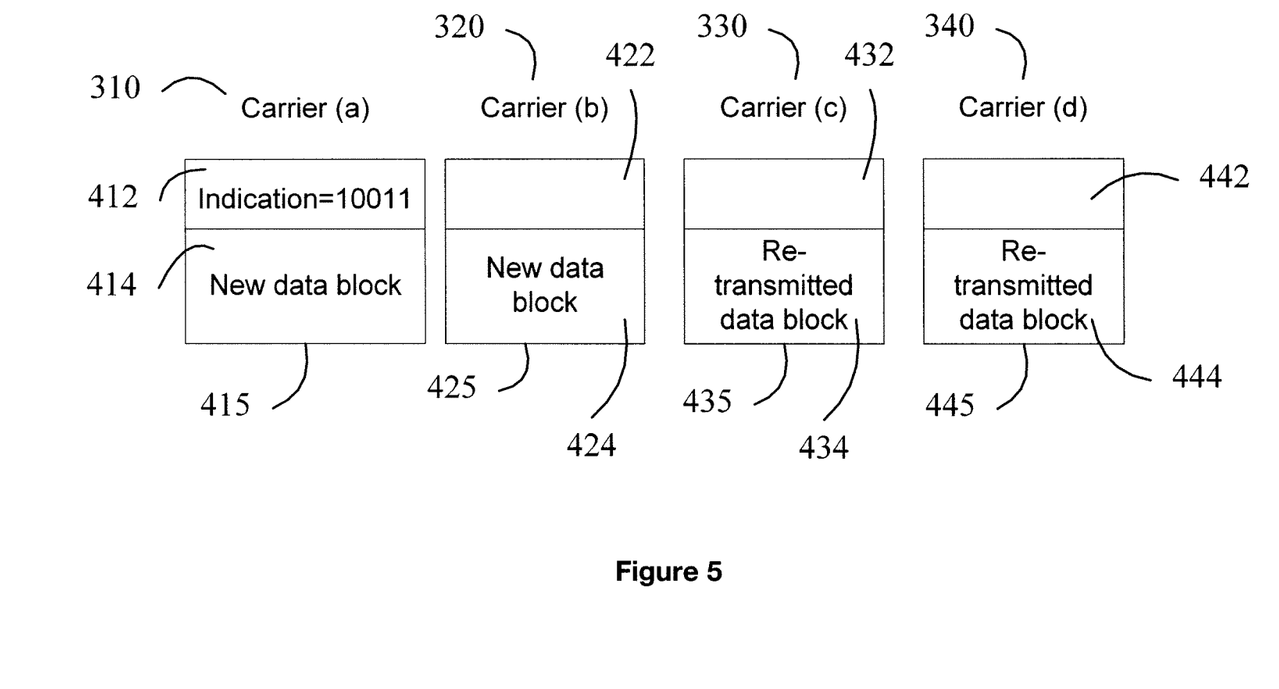
FIG. 5 schematically illustrates transmission control frames at a time interval according to an embodiment of the present invention.

FIG. 5 describes an illustrative embodiment of the method according to the invention at the emitter (respectively receiver), wherein the signalling bits of the indications of a plurality of transmission control frames at the same time interval are grouped into a single transmission control frame.

Once the method according to an embodiment of the invention has been carried out at a given time interval at the emitter (respectively receiver), indications may, in an alternative embodiment, be inserted (respectively retrieved) in one, or a plurality of, different transmission control frame(s) rather than in each corresponding transmission control frame.

Each indication may be easily derived from the sequence(s) of binary bits as long as they remain ordered.

Taking the example of FIG. 5, the indication inserted (respectively retrieved) in the first transmission control frame is '10011' and there are four carriers at the total. Consequently, two bits are needed to first code (respectively identify) a carrier used at the previous corresponding time slot among the four carriers. Bits '10' correspond thus to the indication in the transmission control frame on the first carrier. The carrier coded (respectively identified) by '10' is carrier (c) which is removed from the list of carriers. Then, as three carriers remain in the list of carriers, 2 bits are still needed to code (respectively identify) a carrier. The following 2 bits are thus analyzed together: '01' indicates that the second carrier of the sequence (00, 01, 10, 11) corresponding to the list of remaining carriers (a, b and d), namely carrier (b), will be used (respectively was used) to transmit the same transmission control frame on time interval $t_0$.

In an alternative embodiment of the method according to the invention and as explained previously, carriers for transmission control frames for retransmitted block may be allocated first by the emitter for ensuring frequency diversity.

In reference to FIG. 4, carriers (a) and (b) may thus be respectively allocated to transmission control frames $d_0$ and $a_0$.

Table 1 shows an example of the number of signalling bits that may be saved using the method according to an embodiment of the invention. The greater number of carriers is used, the more signalling bits are saved.

TABLE 1

HARQ process indication bits comparison

| Number of CC | Bits needed with an embodiment of the invention | Bits needed in prior art | Number of bits saved | Proportion of bits saved |
|---|---|---|---|---|
| 1 | 3 | 3 | 0 | 0 |
| 2 | 7 | 8 | 1 | 12.5% |
| 3 | 12 | 15 | 3 | 20% |
| 4 | 17 | 20 | 3 | 15% |
| 5 | 23 | 30 | 7 | 23.3% |
| 6 | 29 | 36 | 7 | 19.4% |

An exemplary embodiment of the present disclosure relates to a non-transitory computer-readable medium having computer-executable instructions to enable a computer system to perform a method of coding the identification of carriers from a list of carriers in a telecommunication network, each of said carriers allowing transmission of a transmission control frame, each of the transmission control frame comprising:
   a data block corresponding to a data stream, and
   an indication of a previous carrier allocated to the data stream,
said method comprising, for a transmission control frame and a carrier selected for allocation to said transmission control frame in said list of carriers:
   determining with an emitter device the number of binary bits needed to identify the number of carriers in the list of carriers,
   coding with an emitter device the indication based on the determined number of binary bits,
   removing the allocated carrier from the list of carriers, and renumbering the remaining carriers in the list of carriers.

Another exemplary embodiment of the present disclosure relates to a non-transitory computer-readable medium having computer-executable instructions to enable a computer system to perform a method of identifying carriers from a list of carriers in a telecommunication network, each of said carriers allowing transmission of a transmission control frame, each of said transmission control frame comprising:
   a data block corresponding to a data stream, and
   an indication of a previous carrier allocated to the data stream,
said method comprising, for a transmission control frame received on a given carrier in said list of carriers, the following steps, at least one of which being performed by a user equipment device:
   identifying a carrier in the list of carriers using the indication,
   removing the identified carrier from the list of carriers, and renumbering the remaining carriers in the list of carriers.

The invention claimed is:

1. A method of coding the identification of carriers from a list of carriers in a telecommunication network, each of said carriers allowing transmission of a transmission control frame, each of said transmission control frame comprising:
   a data block corresponding to a data stream, and
   an indication of a previous carrier allocated to the data stream,
said method comprising, for a transmission control frame and a carrier selected for allocation to said transmission control frame in said list of carriers:
   determining with an emitter device the number of binary bits needed to identify the number of carriers in the list of carriers,
   coding with an emitter device the indication based on the determined number of binary bits,
   removing the allocated carrier from the list of carriers, and renumbering the remaining carriers in the list of carriers.

2. A method according to claim 1, said method further comprising inserting the indication in each corresponding transmission control frame.

3. A method according to claim 1, said method further comprising inserting the indication for each transmission control frame on each carrier at a time interval in one, or a plurality of, different transmission control frames.

4. A method according to claim 1, said method further comprising a preliminary step of receiving a feedback message on a transmission control frame previously transmitted, said feedback message comprising the information that the data block comprised in said transmission control frame was an erroneous data block.

5. A method of identifying carriers from a list of carriers in a telecommunication network, each of said carriers allowing transmission of a transmission control frame, each of said transmission control frame comprising:
   a data block corresponding to a data stream, and
   an indication of a previous carrier allocated to the data stream,
said method comprising, for a transmission control frame received on a given carrier in said list of carriers, the following steps, at least one of which being performed by a receiver device:
   identifying a carrier in the list of carriers using the indication,
   removing the identified carrier from the list of carriers, and renumbering the remaining carriers in the list of carriers.

6. A method according to claim 5, said method further comprising retrieving the indication in each corresponding transmission control frame.

7. A method according to claim 5, said method further comprising retrieving the indication of a plurality of transmission control frame in one, or a plurality of, different transmission control frames.

8. A method according to claim 5, said method further comprising a preliminary step of sending a feedback message on a transmission control frame previously transmitted, said feedback message comprising the information that the data block comprised in said transmission control frame was an erroneous data block.

9. A method according to claim 5, said method further comprising a preliminary step of numbering the carriers in the list of carriers.

10. An emitter for coding the identification of carriers from a list of carriers in a telecommunication network, each of said carriers allowing transmission of a transmission control frame, each of said transmission control frame comprising:
   a data block corresponding to a data stream, and
   an indication of a previous carrier allocated to the data stream,
said emitter comprising, for a transmission control frame and a carrier selected for allocation to said transmission control frame in said list of carriers:
   a computer processing system configured to perform steps of:
   determining the number of binary bits needed to identify the number of carriers in the list of carriers,
   coding the indication based on the determined number of binary bits,
   removing the allocated carrier from the list of carriers, and
   renumbering the remaining carriers in the list of carriers.

11. An emitter according to claim 10, said computer processing system being further configured to insert the indication in each corresponding transmission control frame.

12. An emitter according to claim 10, said computer processing system being further configured to insert the indication for each transmission control frame on each carrier at a time interval in one, or a plurality of, different transmission control frames.

13. An emitter according to claim 10, said computer processing system being further configured to receive a feedback message on a transmission control frame previously transmitted, said feedback message comprising the information that the data block comprised in said transmission control frame was an erroneous data block.

14. An emitter according to claim 10, said computer processing system being further configured to insert for numbering the carriers in the list of carriers.

15. A receiver for identifying carriers from a list of carriers in a telecommunication network, each of said carriers allowing transmission of a transmission control frame, each of said transmission control frame comprising:
   a data block corresponding to a data stream, and
   an indication of a previous carrier allocated to the data stream,
said receiver comprising, for a transmission control frame received on a given carrier in said list of carriers:
   a computer processing system configured to perform steps of:
   identifying a carrier in the list of carriers using the indication,
   removing the identified carrier from the list of carriers, and
   renumbering the remaining carriers in the list of carriers.

16. A receiver according to claim 15, said computer processing system being further configured to retrieve the indication in each corresponding transmission control frame.

17. A receiver according to claim 15, said computer processing system being further configured to retrieve the indication of a plurality of transmission control frame in one, or a plurality of, different transmission control frames.

18. A receiver according to claim 15, said computer processing system being further configured to send a feedback message on a transmission control frame previously transmitted, said feedback message comprising the information that the data block comprised in said transmission control frame was an erroneous data block.

19. A receiver according to claim 15, said computer processing system being further configured to number the carriers in the list of carriers.

20. A system, said system comprising:
   a telecommunication network,
   an emitter in said telecommunication network for coding an identification of carriers from a list of carriers in the telecommunication network, each of said carriers allowing transmission of a transmission control frame, each of said transmission control frame comprising:
      a data block corresponding to a data stream, and
      an indication of a previous carrier allocated to the data stream,
      said emitter comprising, for a transmission control frame and a carrier selected for allocation to said transmission control frame in said list of carriers:
         a first computer processing system configured to perform steps of:
         determining the number of binary bits needed to identify the number of carriers in the list of carriers,
         coding the indication based on the determined number of binary bits,
         removing the allocated carrier from the list of carriers, and
         renumbering the remaining carriers in the list of carriers, and
   a receiver in said telecommunication network receiver for identifying the carriers from the list of carriers, said receiver comprising, for a transmission control frame received on a given carrier in said list of carriers:
      a second computer processing system configured to perform steps of:
      identifying a carrier in the list of carriers using the indication,
      removing the identified carrier from the list of carriers, and
      renumbering the remaining carriers in the list of carriers.

21. A non-transitory computer-readable medium having computer-executable instructions to enable a computer system to perform a method of coding the identification of carriers from a list of carriers in a telecommunication network, each of said carriers allowing transmission of a transmission control frame, each of said transmission control frame comprising:
   a data block corresponding to a data stream, and
   an indication of a previous carrier allocated to the data stream,
said method comprising, for a transmission control frame and a carrier selected for allocation to said transmission control frame in said list of carriers:
   determining with an emitter device the number of binary bits needed to identify the number of carriers in the list of carriers,
   coding with an emitter device the indication based on the determined number of binary bits,
   removing the allocated carrier from the list of carriers, and
   renumbering the remaining carriers in the list of carriers.

22. A non-transitory computer-readable medium having computer-executable instructions to enable a computer system to perform a method of identifying carriers from a list of carriers in a telecommunication network, each of said carriers allowing transmission of a transmission control frame, each of said transmission control frame comprising:
   a data block corresponding to a data stream, and
   an indication of a previous carrier allocated to the data stream,
said method comprising, for a transmission control frame received on a given carrier in said list of carriers, the following steps, at least one of which being performed by a user equipment device:

identifying a carrier in the list of carriers using the indication,     removing the identified carrier from the list of carriers, and renumbering the remaining carriers in the list of carriers.

\* \* \* \* \*